INVENTOR.
J. RONDLE WRIGHT

INVENTOR.
J. RONDLE WRIGHT

United States Patent Office 2,810,517
Patented Oct. 22, 1957

2,810,517

APPARATUS FOR MEASUREMENT OF ENGINE POWER

J. Rondle Wright, Morton, Pa., assignor to Sun Oil Company, Philadelphia, Pa., a corporation of New Jersey Application September 4, 1951, Serial No. 245,029

6 Claims. (Cl. 235—61)

This invention relates to apparatus for the measurement of engine power and, in particular, has reference to the measurement of the power generated in each cylinder of an engine. Briefly stated, the apparatus involves a close approximation to the determination of the integral of the product of pressure within a cylinder by the derivative with respect to time of the volumetric displacement of the piston, the integration being over the time of a single cycle.

In multi-cylinder engines, it is generally very difficult to determine to any degree of reasonable accuracy the power generated by individual cylinders. Such a determination is desirable for purposes of adjustment of the engine to achieve maximum efficiency. The usual indicators are quite inaccurate with respect to measurements of pressure and the diagrams obtained require integration by means of a planimeter in order to secure the desired information, so that comparisons of the operations of different cylinders under the same operating conditions are relatively difficult. The indicators commonly used involve mechanical parts the inertia of which is detrimental to the securing of accurate results at high speeds of operation.

In accordance with the present invention, an electronic type of apparatus is provided for the measurement of engine power which involves no mechanically moving parts to any extent in which inertial conditions give rise to inaccuracies. In brief, the apparatus involves the use of strain gauges for the measurement of cylinder pressures which gauges involve only minute mechanical movements of their parts and are capable of following accurately extremely high rates of change of pressures. Piston displacement is obtained from the use of a cam on or connected to the output shaft of the engine operating a core determining the mutual inductance between a pair of input and output coils. The shaft of an engine operates at sufficiently low speed to make accurate the determination of volumetric displacement, and in particular, the cam may be accurately contoured to give a very precise indication of this displacement. Strain gauges for pressure measurements may be provided in all of the cylinders of a multi-cylinder engine and a simple switching arrangement may be provided to measure selectively the powers generated by the various cylinders so that comparable measurements may be easily effected under a single set of operating conditions, the power of each cylinder being measurable practically instantaneously.

In particular, however, the present apparatus gives rise to very high accuracy of power measurement, well beyond any accuracies obtainable through engine indicators heretofore known.

While the indications of strain gauges tend to drift with time and with variations in conditions of operation such as changes of temperature, the apparatus of the present invention is quite independent of such drifts since each pressure measurement during a cycle is in effect referred to the lowest pressure which occurs during the cycle. In other words, only the entirely negligible drift of characteristics occurring during a single cycle can have any possible effect on the strain gauge output.

While not necessary to a determination of power, the present apparatus also provides the desirable feature of indicating peak pressure differences during individual cycles of operation. The present apparatus in so doing gives the range between maximum and minimum pressures independently of drifts of strain gauge characteristics over extended periods of time.

A further object of the invention is the provision of a novel method of approximate integration of the product of two variables, particularly under conditions of cyclic repetition of such variables.

The foregoing and other objects of the invention, particularly relating to details of construction and operation, will become apparent from the following description read in conjunction with the accompanying drawings, in which.

Figure 1:
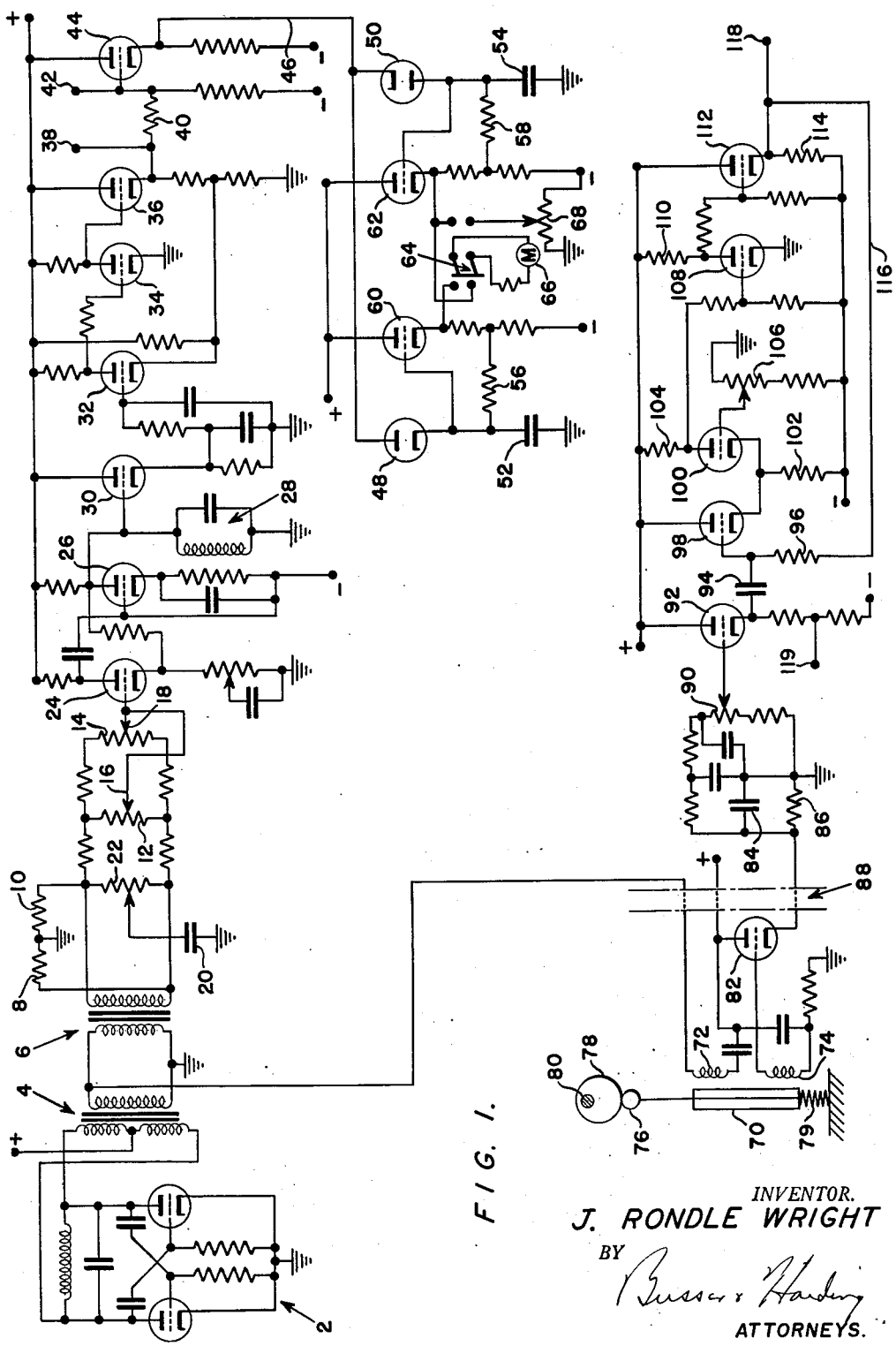
Figure 1 is a wiring diagram showing in particular the portions of the apparatus having to do with the obtaining of output signals indicative of pressure variations and variations of the first derivative of the volume with respect to time.

Referring first to Figure 1, there is indicated at 2 an exciting oscillator which may be of any conventional type designed to provide an output of reasonably high frequency, for example, an input at 3 kilocycles such as has been found to be highly satisfactory. This output is delivered through a transformer 4 and then through a second transformer 6 to the differentially arranged resistance elements 8 and 10 of a conventional strain gauge. Such a gauge, as is usual, is of a type such that increase of pressure will result in increase of value of one resistance and decrease in value of the other. As indicated in Figure 1, the junction of these resistances is grounded while their free ends are connected in a bridge circuit involving in particular the potentiometers 12 and 14, the contacts 16 and 18 of which are adjustable for a desired zero adjustment. Desirably, an additional potentiometer 22 is provided across the free terminals of the resistances 8 and 10 and is connected to ground through a condenser 20 for the purpose of balancing out as far as possible quadrature components from the output of the bridge. The bridge, excited by the oscillator 2, provides its output to the grid of a triode 24 which is associated with a second triode 26 in a conventional negative feed-back amplifier arrangement, the negative feed-back being provided to improve linearity of response. At 28 there is provided a load for the output of triode 26 which is tuned to the excitation frequency.

Figure 3:
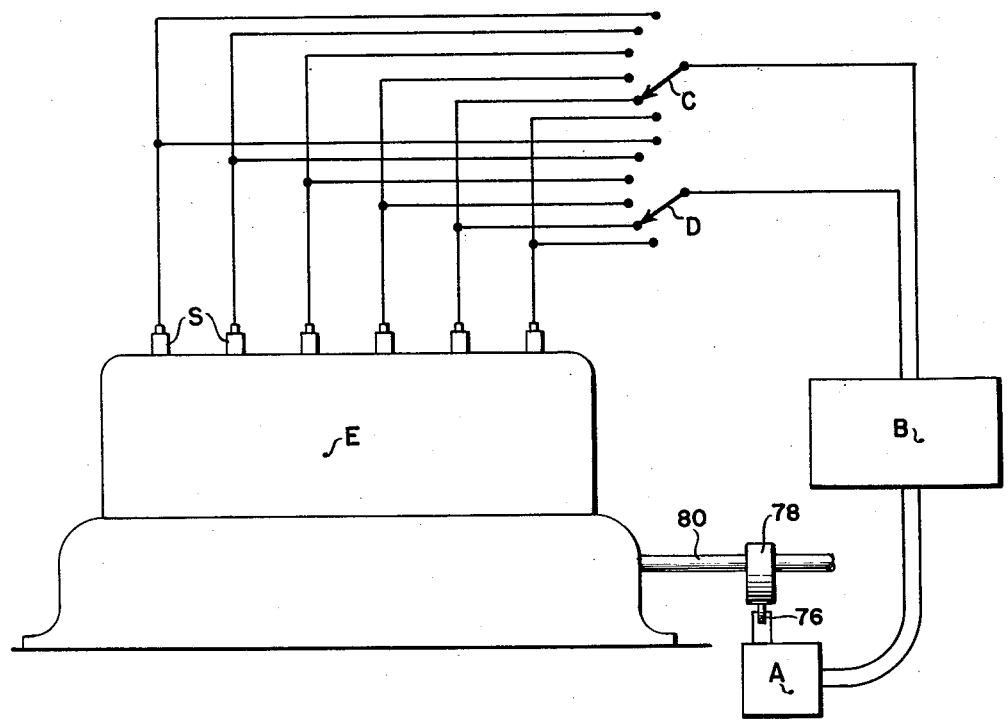
Figure 3 is a diagram illustrating the association of the improved apparatus with a multi-cylinder engine.

The output from the amplifier comprises the oscillator frequency as carrier modulated in accordance with the changes of resistances occurring in the strain gauge due to pressures in the engine cylinder to which the strain gauge is exposed. It may be here remarked that the strain gauge may be provided in the form of a plug S (Figure 3) insertable in a tapped opening in an engine cylinder.

The triode 30 and its circuit provides rectification for the modulated carrier referred to and amplification of the demodulated signal representative of pressures applied to the strain gauge is effected by means of the amplifiers 32 and 34, the output of the amplifying triode 34 being provided to the grid of the triode 36 arranged in a cathode follower circuit as shown. The cathode of triode 36 is connected directly to an output terminal 38 which will be hereafter referred to and is also connected through a resistor 40 to a second output terminal 42 which may be connected to the input terminal of a cathode ray oscilloscope.

Terminal 42 is connected to the grid of a triode 44 in a cathode follower arrangement, the cathode of this triode being joined by connection 46 to the anode of a diode 48 and to the cathode of a second diode 50. The cathode of diode 48 is connected to one terminal of a condenser 52 the other terminal of which is grounded. The anode of diode 50 is connected to one terminal of a similar condenser 54 the other terminal of which is grounded. High resistances 56 and 58 connect the ungrounded terminals of condensers 52 and 54, respectively, into the cathode resistors of a pair of cathode followers comprising the triodes 60 and 62. It will be noted that the cathode resistors return to negative potential supply terminals. A double-pole double-throw switch 64 is associated with a voltage-reading meter 66 which may comprise a microammeter in series with a high resistance. Through the use of the switch 64 the voltmeter thus provided may be connected between the cathodes of triodes 60 and 62 or, alternatively, between the cathode of triode 62 and the contact of a potentiometer 68 which is provided between a negative supply voltage terminal and ground.

Ordinarily, during operation the switch 64 will be in the left-hand position illustrated. In the right-hand position, it will serve to connect the meter 66 so as to read the scavenging pressure.

The arrangement last described provides a peak pressure meter for reading the maximum value of the peak pressure above the lowermost pressure value which will ordinarily be that of the scavenging pressure in a two-cycle Diesel engine, though it will be understood that the present apparatus is designed for use in connection with gas engines as well, and, in fact, may well be used for measuring the power of steam engines. The circuit running from the strain gauge is highly linear and the potentials appearing at the terminals 38 and 42 are accurately linearly related to the pressures existing in the engine cylinder under observation. It will be evident that due to the arrangement of the diodes 48 and 50 in connection with their condensers 52 and 54, the former will accumulate a potential corresponding to the peak pressure of the cylinder while the condenser 54 will accumulate a potential corresponding to the lowest pressure in the cylinder. The meter 66 when connected between the cathodes of triodes 60 and 62 will, accordingly, indicate the difference between the maximum and minimum pressures and this indication will be independent of drift of the strain gauge except for such negligible drift as may occur during a single cycle. It may be remarked that at the grid of triode 24 there may appear 0.75 microvolt of signal per volt applied per pound per square inch of pressure in the cylinder, while at terminal 38 a variation of potential from 60 to 160 volts may be typically obtained representing a change of pressure from 0 to 500 pounds per square inch, or, in other words, one volt at this terminal may correspond to five pounds per square inch of pressure, there thus resulting possibility of measuring a quite large pressure range to a high degree of accuracy.

It may be noted that at terminal 38 a potential appears which is not independent of drift of the strain gauge so far as absolute value of potential corresponding to pressure is concerned. However, as will appear hereafter, where the pressure signal appearing at this terminal is used, there is also effectively comparison with the minimum pressure appearing in the signal so that, actually, the ultimate reading of power is also independent of drift of the strain gauge characteristics. The oscillograph terminal 42 is not of importance so far as accuracy is concerned since, in the present apparatus, an oscillograph is merely a convenience for giving a visual picture of the engine cycle. In general, oscillographs, themselves, are so inaccurate and non-linear that refinement in the matter of the input thereto is not warranted.

Considering now the lower portion of Figure 1, there is indicated at 70 a movable ferromagnetic core acting as the core of a transformer comprising the primary winding 72 and the secondary winding 74. This core may be moved by a follower 76 engageable with a cam 78 which serves to move the core against the action of a spring 79, the cam 78 being carried by the engine shaft 80 or by an auxiliary shaft suitably driven in accurate phase relationship by the engine shaft. As will appear, the object is to provide the first derivative of the volumetric displacement of the piston with respect to time. The cam may be suitably contoured to take into account the characteristics of the induction between the primary coil 72 and the secondary coil 74, angularity of the connecting rods, etc. The cam 78 must, of course, be arranged to be shiftable angularly about its shaft if various cylinders of a multi-cylinder engine are to be subjected to measurement, the shifts to take into account the differences in phasing of the various cylinders.

The primary coil 72 is excited by the oscillator 2 through the transformer 4 and induces in the secondary coil 74 a signal comprising the carrier of the oscillator modulated in accordance with the position of the core 70 which, in turn, is related to the volumetric displacement of the piston. The signal thus secured is transmitted to the grid of triode 82 which is preferably located adjacent to the variable transmitting transformer being connected to the other portions of the apparatus through a cable which may be of considerable length and which is indicated by the dotted lines at 88.

The triode 82 is actually in a cathode follower circuit the resistance of which is at 86. The circuit constants are so chosen that rectification occurs, demodulating the carrier and giving rise at the condenser 84 to a signal at the frequency of the engine cycles and corresponding to the volumetric displacement of the piston. From the network provided a signal is taken adjustably from a potentiometer 90 and introduced to the triode 92. The triode 92 is in a cathode follower circuit and the signal appearing at its cathode is differentiated by the arrangement provided by the condenser 94 and resistance 96 and additional circuitry insuring accurate differentiation. Mathematically accurate differentiation is here required and, accordingly, there is provided the feed-back arrangement following the condenser 94. A pair of triodes 98 and 100 have their cathodes connected together and to the negative potential supply line through a resistance 102. Triode 100 has a load resistor 104 and its grid is arranged at an adjustable but fixed potential by connection to the potentiometer 106 connected between ground and the negative potential supply line. The junction of condenser 94 and resistance 96 is connected to the grid of triode 98 and there is thus provided a differential amplifier which will emit a large signal if the potential of the grid of triode 98 departs from the potential of the grid of triode 100. This signal is emitted from the anode of triode 100 and is fed to the grid of an amplifier triode 108 provided with an anode load resistor 110, the anode of triode 108 being connected to the grid of triode 112 which is in a cathode follower circuit including the cathode resistor 114. The cathode of triode 112 is connected through line 116 to the lower end of resistance 96 and is also connected to a terminal 118 which will be referred to hereafter and at which there appears the first derivative of the volumetric displacement of the piston with respect to time. The differentiating system thus provided is highly accurate in view of the fact that the differential amplifier tends to maintain the grid of triode 98 at almost precisely the potential of the grid of triode 100, the result being essentially that the condenser 94 has across it a potential at all times equal to the potential difference between the cathode of triode 92 and a fixed potential. As is well known, there follows from this accurate differentiation of the signal appearing at the variable potential terminal of the condenser. The value of the derivative appears at terminal 118 by reason of the potential drop through resistor 96 due to charging current of the condenser. (It should be noted that the potential appearing at 118 is the negative of the derivative of the potential at the cathode of triode 92 if the latter is considered positive.) Terminal 119 is a convenient point for the connection of the horizontal deflection input of an oscillograph, the vertical deflection input of which may be from terminal 42 to give a visual indication of the pressure-volume changes.

Figure 2:
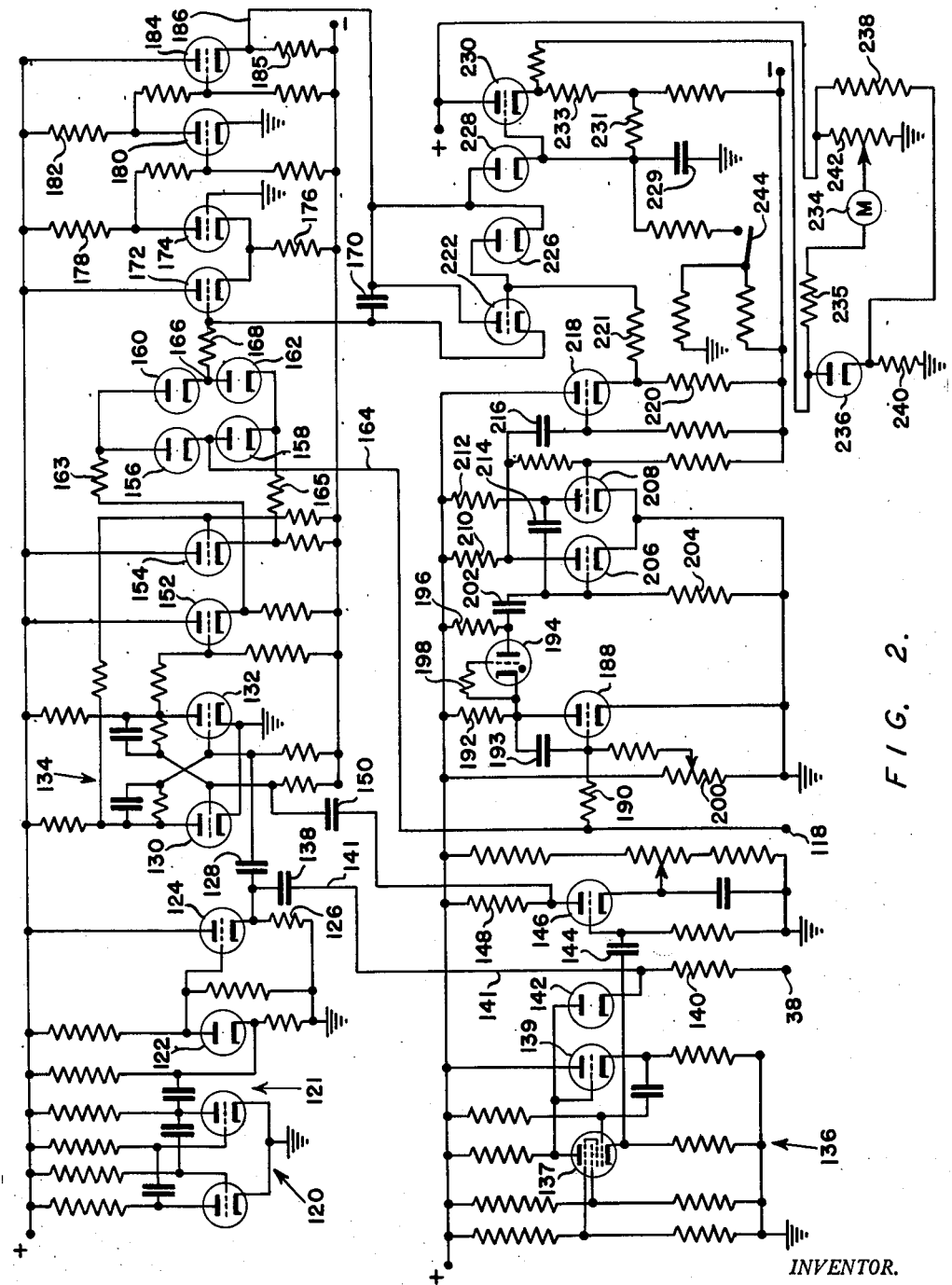
Figure 2 is a diagram continuing Figure 1 but, in particular, relating to the integration which is required for the determination of power.

Referring now to Figure 2, there is indicated at 120 a conventional multivibrator capable of providing an alternating exciting potential which may, for example, have a frequency of about 200 cycles per second. In the present apparatus, this frequency is fixed, and, in fact, is maintained fixed at a quite constant frequency by the multivibrator action. As will appear hereafter, the power indications obtained as a result must be corrected for engine speed in order to determine true horsepower. If this multivibrator was made to operate at a frequency proportional to the engine speed, such correction would not be required. However, since the correction is so simple, there is little cause to provide for control of the oscillator frequency in linear dependence upon the engine speed. The present apparatus, therefore, utilizes a fixed exciting frequency. The output of the multivibrator, or other oscillator which may be provided, is differentiated by the RC combination 121 to provide positive and negative pulses, the latter being passed by diode 122 to the grid of the triode 124 arranged as a cathode follower in connection with the load resistor 126, this cathode follower stage providing, in effect, a buffer so that the multivibrator frequency will not be affected by the following circuits. The cathode of triode 124 is connected through condenser 128 to the grid of a triode 132 which is associated with a second triode 130 in a bistable multivibrator circuit of conventional type illustrated generally at 134. As will appear hereafter, a negative pulse through condenser 128 cuts off the triode 132 which will theretofore have been conducting with the result that triode 130 will become conductive until a negative pulse is received by its grid. The result is a square wave output from the anodes of the triodes 130 and 132.

At 136 there is shown a phantastron circuit similar to that illustrated on page 287 of "Waveforms," volume 19, Radiation Laboratory Series, to which reference may be made for details of construction and operation. Briefly stated, it comprises the pentode 137, triode 139 and diode 142, the cathode of the diode being connected through line 141 and condenser 138 to the cathode of triode 124. The cathode of diode 142 is also connected through resistor 140 to the terminal 38 shown in Figure 1. A negative signal emitted from the cathode of triode 124 initiates operation of the phantastron which has a period of operation before restoration which depends upon the potential occurring at terminal 38. Between initiation of the phantastron operation and its restoration to initial condition, there is emitted through the condenser 144 connected to the cathode of pentode 137 a negative rectangular wave the duration of which is accurately linearly proportional to the potential at terminal 38 which, as has been previously described, is linearly related to the pressure existing in the engine cylinder. The duration of the phantastron output pulse is very short compared with the period of the engine cycle and, accordingly, so far as control of the phantastron is concerned, the pressure may be considered constant through the duration of a single phantastron output pulse. The condenser 144 delivers the pulse to the grid of amplifier triode 146 which is provided with the anode load resistor 148. The anode of triode 146 is connected through condenser 150 to the grid of triode 130.

A negative pulse at the cathode of triode 124 will, as stated above, trip the bistable multivibrator 134 so as to cut off the triode 132 and render conductive the triode 130. This same pulse initiates the phantastron operation. At the end of the rectangular pulse from the phantastron, a positive pulse will be produced on the grid of triode 146, which is normally biased to cutoff, resulting in a negative pulse at the anode of this triode and, consequently, in a negative pulse on the grid of triode 130 which will return the bistable multivibrator to its initial condition of conductivity of triode 132 and cut off condition of triode 130. The result, accordingly, is that upon the occurrence of each negative pulse at the cathode of triode 124 the anode of triode 132 will go positive and the anode of triode 130 negative, these conditions being maintained until the end of the operation of the phantastron when a reversal in relative polarities will occur. The anode pulses thus occurring are transmitted respectively to the cathode follower arrangements of triodes 152 and 154 with resulting production through resistors 163 and 165 of corresponding potentials at the anodes of diodes 156 and 160 and at the cathodes of diodes 158 and 162, respectively. These diodes 156, 158, 160 and 162 are arranged in a conventional switching arrangement capable of providing during the interval of a positive pulse at the anodes of diodes 156 and 160 of a connection between a line 164 joined to the junction of the cathode of diode 156 with the anode of diode 158 and the point 166 of connection between the cathode of diode 160 and the anode of diode 162. When the potential condition just mentioned does not exist, these junctions are effectively insulated from each other. The connection 164 runs to the terminal 118 shown in Figure 1 and previously described.

The result of the foregoing is the production of a series of pulses at the point 166 at the frequency of the oscillator 120 each of which pulses has an amplitude equal to the value of the derivative of volumetric displacement occurring at terminal 118 and of a duration proportional to the pressure signal existing at the terminal 38. It will be evident that the area of such a pulse when graphically illustrated will be, therefore, proportional to the product of pressure by the first time derivative of the volumetric displacement which simultaneously exists at the instant of the positive switching pulse which, as indicated above, is of very short duration compared with the period of a cycle. It may be remarked that the frequency of 200 cycles per second of the multivibrator is suitable for measurements of conditions in a cylinder of a large diesel engine the duration of the cycle of which may be of the order of two-thirds of a second. With higher speed engines, it is, of course, desirable to utilize higher pulsing frequencies and the multivibrator-oscillator 120 would, accordingly, be constructed to operate at substantially higher frequencies. Desirably, there should be upwards of 100 pulses produced for each engine cycle.

The pulses at terminal 166 are fed to an integrator which comprises the resistor 168 and condenser 170 in association with the triodes 172, 174, 180 and 184 and their circuits as illustrated. The feed-back arrangement thus provided gives rise to high accuracy of integration. Triodes 172 and 174 have their cathodes connected together and through a resistance 176 to the negative potential supply line, the anode of triode 174 being provided with the load resistor 178. The grid of triode 174 is grounded while the grid of triode 172 is connected to the junction of resistance 168 and condenser 170. A high gain differential amplifier is thus provided the output signal of which is delivered to the amplifier arrangement of triode 180 and its anode load resistor 182 and from this to the grid of triode 184 which is in a cathode follower arrangement with its cathode resistor 185. The cathode of triode 184 is connected back to the condenser 170 through line 186. By reason of the differential amplifier and feed-back arrangement, the grid of triode 172 is maintained substantially constant at the potential of the grid of triode 174, i. e., ground potential. The result is true integration, the integral of the input appearing as a potential across the condenser 170, the side connected to connection 186 rising in potential with negative signals applied to the grid of triode 172. The arrangement is such that over a cycle the condenser acquires a net change such that its right hand terminal is positive; i. e. the high pressure signals produce wide negative signals applied to the grid of triode 172 as compared with relatively narrow positive signals produced by low pressures.

If provision otherwise was not made, the integration thus provided would take place over successive cycles of the engine operation. Arrangements are, therefore, provided to insure integration only over a single cycle, the integration being performed anew for each successive cycle.

To achieve the last result a triode 188 has its grid connected through resistance 190 to terminal 118. Triode 188 has an anode load resistor 192 and connected between its anode and grid is a condenser 193. The anode of triode 188 is also connected to the cathode of a thyratron 194, the grid of which is connected to its cathode through resistance 198. The anode of thyratron 194 is connected to the positive potential supply line through load resistor 196. The grid of triode 188 is connected through a resistor to the contact of a potentiometer 200 connected between the positive potential supply line and ground, the adjustment thus afforded being for the purpose of accurately fixing the occurrence of the transition about to be described.

As will be evident from consideration of the foregoing matters, the terminal 118 will have applied thereto an approximately sinusoidal wave, corresponding to the derivative of the volumetric displacement, which will be of considerable amplitude. When this wave is negative, triode 188 will be cut off and, consequently, the potentials of both the cathode and anode of thyratron 194 will be the same, both being the value of the positive supply line potential. When, however, the wave applied at 118 passes through a zero value going positive, the triode 188 will become conductive and because of the large swing of this wave will, in a very short interval, change from a cut-off condition to a highly conductive condition. When this transition occurs, the result is a sharp drop of potential at the anode of triode 188 resulting in a corresponding drop of potential of the cathode of thyratron 194 resulting in firing of this thyratron. Multiple firing of the thyratron by the high frequency components of the differentiated volume signal at 118 is prevented by the filtering action of condenser 193 in combination with its associated resistances. The result is high stability of operation, insuring against multiple firings of the thyratron 194 in any engine cycle and also substantial insurance against spurious firings due to any transients.

Upon firing of thyratron 194, which as already indicated occurs as the derivative of displacement signal passes through zero in a positive excursion, a negative pulse is emitted from the anode of the thyratron through condenser 202 to the grid of a triode 206 which is associated with a triode 208 in a monostable multivibrator arrangement involving interconnection between the anode of triode 208 and the grid of triode 206 through condenser 214. The anodes of these triodes are provided with respective load resistors 210 and 212. Their cathodes are connected together and to ground. A resistor 204 is connected between the grid of triode 206 and ground. The result is differentiation of the negative pulse imparted to the condenser 202. The multivibrator just described involves in its stable condition conducting condition of the triode 206. The negative spike resulting from the differentiation just mentioned cuts off the triode 206 and renders triode 208 conducting. In view of the monostable condition of the multivibrator, however, this condition persists only for a short interval which, for example, consistent with other figures which have been given for the circuit, may have a period of about five milliseconds. The result, accordingly, is the emission of a substantially rectangular pulse from the anode of triode 206 having a duration of about five milliseconds.

This pulse is transmitted through condenser 216 to the grid of triode 218 which is in a cathode follower arrangement with the cathode load resistor 220. The cathode of triode 218 is connected through a resistance 221 to the grid of a triode 222 the anode and cathode of which are respectively connected as illustrated across the condenser 170. During the five millisecond pulse referred to the triode 222 becomes highly conductive resulting in discharge of condenser 170 which, under ordinary conditions, will fully discharge in approximately one millisecond. The positive excursion of the grid of triode 222 is limited by reason of its connection to the anode of a diode 226 the cathode of which is connected to line 186. From the foregoing, it will be evident that the condenser 170 accumulates a charge by integrating action only through one cycle of the engine inasmuch as it is discharged at the same point in corresponding successive cycles. The result is single cycle integration with the condenser 170 acquiring at its right hand terminal a potential corresponding to the integration of the various pulses previously described which have amplitudes corresponding to the derivative of the displacement of the piston and durations coresponding to the pressure. Provision is accordingly made for exhibiting this integral (which as indicated hereafter is a measure of power developed in the cylinder undergoing measurement) by a peak voltmeter arrangement. This voltmeter arrangement comprises the diode 228 the anode of which is connected to line 186 and the cathode of which is connected to one terminal of a condenser 229 the other terminal of which is grounded. A triode 230 is arranged in a cathode follower arrangement with the cathode resistor 233 to an intermediate point of which there is connected the cathode of diode 228 through a high resistance 231. The grid of triode 230 is connected to the cathode of the diode 228. The cathode of triode 230 is connected to the meter 234 which is in series with a high resistor 235 to provide a voltmeter, one terminal of the meter 234, which may be a microammeter, being connected to the potentiometer contact at 242 to provide for a base adjustment. A diode 236 having its anode connected to the input side of the meter arrangement and its cathode connected to the junction of resistors 238 and 240 connected in series between the posiitve potential supply line and ground limits the potential which may be applied to the meter 234 to prevent damage in the event that through accident an integrated potential accumulates over more than a single cycle.

On the assumption that a considerable number of cycles of the engine involve substantially identical characteristics of operation, it will be evident that a definite potential is accumulated on the condenser 229 which acts as a peak voltmeter in connected with the following cathode follower and the meter 234. If, however, the characteristics of operation gradually change, the charge on condenser 229 may be either augmented or would leak off to correspond. While, therefore, the apparatus responds, in effect, to what occurs during a single cycle, it is actually responsive to what occurs through a series of substantialy similar cycles.

It may be noted that the rectangular pulses which are integrated are both positive and negative in sense and the result is that, so far as the pressure is concerned, a differential situation exists giving rise to a net measurement of horsepower which is independent of any long period drift of the strain gauge, which drift alone is of substantial magnitude.

Reference may be made to the provision at 244 of the switching arrangement through which, if desired, the condenser 229 may be, at any time, manually discharged.

The foregoing description of operation of the circuit will reveal that the meter 234 will read the integral of the products of pressure and the first time derivative of the piston displacement over the period of a cycle from the standpoint of this product summed for the number of pulses occurring in a cycle. For a given speed of operation of the engine, corresponding to a definite period of a cycle and, therefore, to a definite number of the integrated pulses during the cycle, the result will be proportional to the power generated by the engine. If, however, the speed is different, correction must be made by multiplying the indicated result by the ratio of the new speed to the standard speed for which the meter is calibrated. As indicated above, direct reading for all speeds could be made to result if the frequency of the pulses to be integrated was made proportional to the speed; however, the simplicity of correction by using the ratio just mentioned is such as not to warrant the additional complexity of the apparatus which would be introduced by the automatic control of the pulse frequency.

It may be noted that involved herein is the integration of the product of one variable by the derivative of another effected in the form of integration of the product of one variable by the first time derivative of another with respect to time. Further, such integration is carried out effectively for a single period of repetition of such functions by effectively averaging the integration for a number of periods.

It will be evident that the displacement and pressure signals are interchangeable in respect to their control of the integrator; i. e. the integration of the product of displacement and of the first time derivative of pressure could obviously be carried out instead of that of the product as specifically described. Also it will be obvious that the terminals 38 and 118 in Figure 2 could be interchanged, either of the input signals controlling pulse width while the other controls pulse amplitude.

Actually, of course, the integral is approximated by summing through the period of repetition a group of approximately rectangular pulses each of which has an average magnitude equal to the magnitude of one variable at the time of its occurrence and a duration proportional to the magnitude of another variable, one of the two last mentioned variables being in the illustrated case the first time derivative of a third variable, though not necessarily so.

It will be evident that this method of approximate integration by summation may be quite generally applied and, as will be obvious, the accuracy of approximation may be increased as much as desired by increasing the number of pulses in the cycle of the summation.

What is claimed is:

1. Apparatus for the approximate integration of the product of two periodic variables, having the same period, with respect to time comprising means for producing pulses having a frequency substantially higher than said variables, having durations substantially proportional to the values of one variable at the times of production of the pulses and having amplitudes substantially proportional to the values of the other variable at the times of production of the pulses, means providing the integral of said pulses over each of successive periods of said variables, and means providing an output substantially corresponding to the average value of the integrals for a series of such periods.

2. Apparatus for the approximate integration of the product of two periodic variables, having the same period, with respect to time comprising means for producing pulses having a frequency substantially higher than said variables, having durations substantially proportional to the values of one variable at the times of production of the pulses and having amplitudes substantially proportional to the values of the other variable at the times of production of the pulses, means providing the integral of said pulses over each of successive periods of said variables, the last mentioned means including a condenser accumulating a potential proportional to said integral and means for discharging said condenser at the end of each such period, and means providing an output substantially corresponding to the average value of said potential for a series of such periods.

3. Apparatus for the determination of the power developed by an engine cylinder comprising means for developing two outputs, one corresponding to pressure existing in said cylinder and the other corresponding to piston displacement in said cylinder, means responsive to said outputs for producing two potentials, one corresponding to the value of one of said outputs and the other corresponding to the value of the first time derivative of the other of said outputs, means responsive to said potentials for producing pulses having a frequency substantially higher than the frequency of repetition of the engine cycle, having durations substantially proportional to the value of one of said potentials at the times of production of said pulses and having amplitudes substantially proportional to the value of the other of said potentials at the times of production of the pulses, means providing the integral of said pulses over each of successive periods of the engine cycle, and means providing an output substantially corresponding to the average value of the integrals for a series of such periods.

4. Apparatus for the determination of the power developed by an engine cylinder comprising means for developing two outputs, one corresponding to pressure existing in said cylinder and the other corresponding to piston displacement in said cylinder, means responsive to said outputs for producing two potentials, one corresponding to the value of one of said outputs and the other corresponding to the value of the first time derivative of the other of said outputs, means responsive to said potentials for producing pulses having a frequency substantially higher than the frequency of repetition of the engine cycle, having durations substantially proportional to the value of one of said potentials at the times of production of said pulses and having amplitudes substantially proportional to the value of the other of said potentials at the times of production of the pulses, means providing the integral of said pulses over each of successive periods of the engine cycle, the last mentioned means including a condenser accumulating a potential proportional to said integral and means for discharging said condenser at the end of each such period, and means providing an output substantially corresponding to the average value of said potential for a series of such periods.

5. Apparatus for the determination of the power developed by an engine cylinder comprising means for developing two outputs, one corresponding to pressure existing in said cylinder and the other corresponding to piston displacement in said cylinder, means responsive to said outputs for producing two potentials, one corresponding to the value of one of said outputs and the other corresponding to the value of the first time derivative of the other of said outputs, means responsive to said potentials for producing pulses having durations substantially proportional to the values of one potential at the time of production of the pulses and having amplitudes substantially proportional to the values of the other potential at the times of production of the pulses, means providing the integral of said pulses over each of successive time periods each of which has its initiation and termination at the same phase of the engine cycle, and means providing an output substantially corresponding to the average value of the integrals for a series of said time periods.

6. Apparatus for the approximate integration of the product of two periodic variables, having the same period, with respect to time comprising means for producing pulses having a frequency substantially higher than said variables, having durations substantially proportional to the values of one variable at the times of production of the pulses and having amplitudes substantially proportional to the values of the other variable at the times of production of the pulses, means providing the integral of said pulses over each of successive time periods each of which has its initiation and termination at the same phase of said periodic variables, and means providing an output substantially corresponding to the average value of the integrals for a series of said time periods.

References Cited in the file of this patent

UNITED STATES PATENTS

| | | |
|---|---|---|
| 2,349,560 | Reijnst | May 23, 1944 |
| 2,398,238 | McNatt | Apr. 9, 1946 |
| 2,483,300 | Howe | Sept. 27, 1949 |
| 2,508,996 | Elam | May 23, 1950 |
| 2,524,749 | Baldridge et al. | Oct. 10, 1950 |
| 2,643,819 | Yuk Wing Lee et al. | June 30, 1953 |
| 2,665,066 | Hornfeck | Jan. 5, 1954 |
| 2,725,191 | Ham | Nov. 29, 1955 |

OTHER REFERENCES

"Electronic Correlator for Solving Complex Signalling Parameters," by T. P. Cheatham, Jr., Tele-Tech, pages 40–43, February 1950.

"Electronic Instruments," by Greenwood et al., Radiation Lab. Series, vol. 21, published by McGraw-Hill, first edition, 1948; pages 50–53.

"Waveforms," by Chance et al., Radiation Lab. Series, vol. 19, page 674, published by McGraw-Hill, first edition, 1949.